US008365241B1

(12) United States Patent
Gunda

(10) Patent No.: US 8,365,241 B1
(45) Date of Patent: Jan. 29, 2013

(54) METHOD AND APPARATUS FOR ARCHIVING WEB CONTENT BASED ON A POLICY

(75) Inventor: Laxmikant Vithal Gunda, Pune (IN)

(73) Assignee: Symantec Corporation, Mountain View, CA (US)

( * ) Notice: Subject to any disclaimer, the term of this patent is extended or adjusted under 35 U.S.C. 154(b) by 749 days.

(21) Appl. No.: 12/135,703

(22) Filed: Jun. 9, 2008

(51) Int. Cl.
*G06F 9/40* (2006.01)
*H04L 29/06* (2006.01)

(52) U.S. Cl. .......................................................... 726/1
(58) Field of Classification Search ........................ None
See application file for complete search history.

(56) References Cited

U.S. PATENT DOCUMENTS

| | | | |
|---|---|---|---|
| 6,185,576 B1 * | 2/2001 | McIntosh | 1/1 |
| 6,366,298 B1 * | 4/2002 | Haitsuka et al. | 715/736 |
| 6,446,119 B1 * | 9/2002 | Olah et al. | 709/224 |
| 6,795,856 B1 * | 9/2004 | Bunch | 709/224 |
| 7,315,891 B2 * | 1/2008 | Donahue | 709/224 |
| 7,493,350 B2 * | 2/2009 | Episale et al. | 707/694 |
| 7,600,086 B2 * | 10/2009 | Hochberg et al. | 711/160 |
| 7,617,263 B2 * | 11/2009 | Brown et al. | 1/1 |
| 7,849,502 B1 * | 12/2010 | Bloch et al. | 726/11 |
| 2002/0019945 A1 * | 2/2002 | Houston et al. | 713/201 |
| 2003/0126049 A1 * | 7/2003 | Nagan et al. | 705/35 |
| 2005/0183143 A1 * | 8/2005 | Anderholm et al. | 726/22 |
| 2007/0271308 A1 * | 11/2007 | Bentley et al. | 707/200 |
| 2007/0300179 A1 * | 12/2007 | Friedlander | 715/781 |
| 2007/0300299 A1 * | 12/2007 | Zimmer et al. | 726/22 |
| 2009/0070166 A1 * | 3/2009 | Lashus et al. | 705/7 |

OTHER PUBLICATIONS

Schulman, "The Extent of Systematic Monitoring of Employee E-mail and Internet Use", Workplace Surveillance Project, Jul. 2001, pp. 1-16.*
Kim et al., "A Case Study on the Development of Employee Internet Management System", Springer-verlag, ICCSA 2005, pp. 1229-1238.*
Miller et al., "Privacy, the Workplace and the Internet", Journal of Business Ethics, 2000, pp. 255-265.*

* cited by examiner

*Primary Examiner* — William Powers
(74) *Attorney, Agent, or Firm* — Campbell Stephenson LLP

(57) ABSTRACT

A method and apparatus for archiving web content is disclosed. In one embodiment, the method comprises monitoring internet activity associated with at least one computer, wherein web content is communicated during the internet activity and analyzing information associated with the internet activity in accordance with a policy. The policy is used to identify a portion of web content to be archived.

25 Claims, 3 Drawing Sheets

METHOD AND APPARATUS FOR ARCHIVING WEB CONTENT BASED ON A POLICY

BACKGROUND OF THE INVENTION

1. Field of the Invention

Embodiments of the present invention generally relate to policy-based internet archiving and, more particularly, to a method and apparatus for policy-based archiving of web content that was communicated during internet activity associated with a computer.

2. Description of the Related Art

An enterprise may employ one or more system for processing and/or storing data. The typical enterprise may use a server computer to provide computer services to multiple client computers. Furthermore, data used by the client computers may be stored or archived onto a storage medium (e.g., an optical disk, a magnetic tape and the like) in a data storage device (e.g., a tape drive, a hard disk drive, a RAID configuration storage array and/or the like). The archived data may be retrieved in the future for various reasons, such as disaster recovery, discovery for pending litigation, ordinary use by the client computers and/or the like.

Currently, archiving software is limited to certain types of data, such as email messages. The archiving software does not archive web content associated with internet activity, such as web pages (e.g., web content, universal Resource Locators (URLS), embedded links and/or the like), files downloaded, sent/received web based e-mail and/or the like. Even though web content may be temporarily stored in a cache (e.g., a browser cache), such a cache is under the control of the user and not the system administrator. Hence, the web content and/or the web pages indicated in the cache may be removed (e.g., purged) and/or modified.

Therefore, there is a need in the art for a method and apparatus for archiving web content associated with internet activity amongst one or more computers in accordance with a policy where the archived web content may be retrieved in the future.

SUMMARY OF THE INVENTION

Embodiments of the present invention comprise a method and system for a policy based internet archiving. In one embodiment, a method for using a policy to archive web content comprises monitoring internet activity associated with at least one computer, wherein the web content is communicated during the internet activity and analyzing information associated with the internet activity in accordance with a policy, wherein the policy is used to identify a portion of the web content to be archived.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
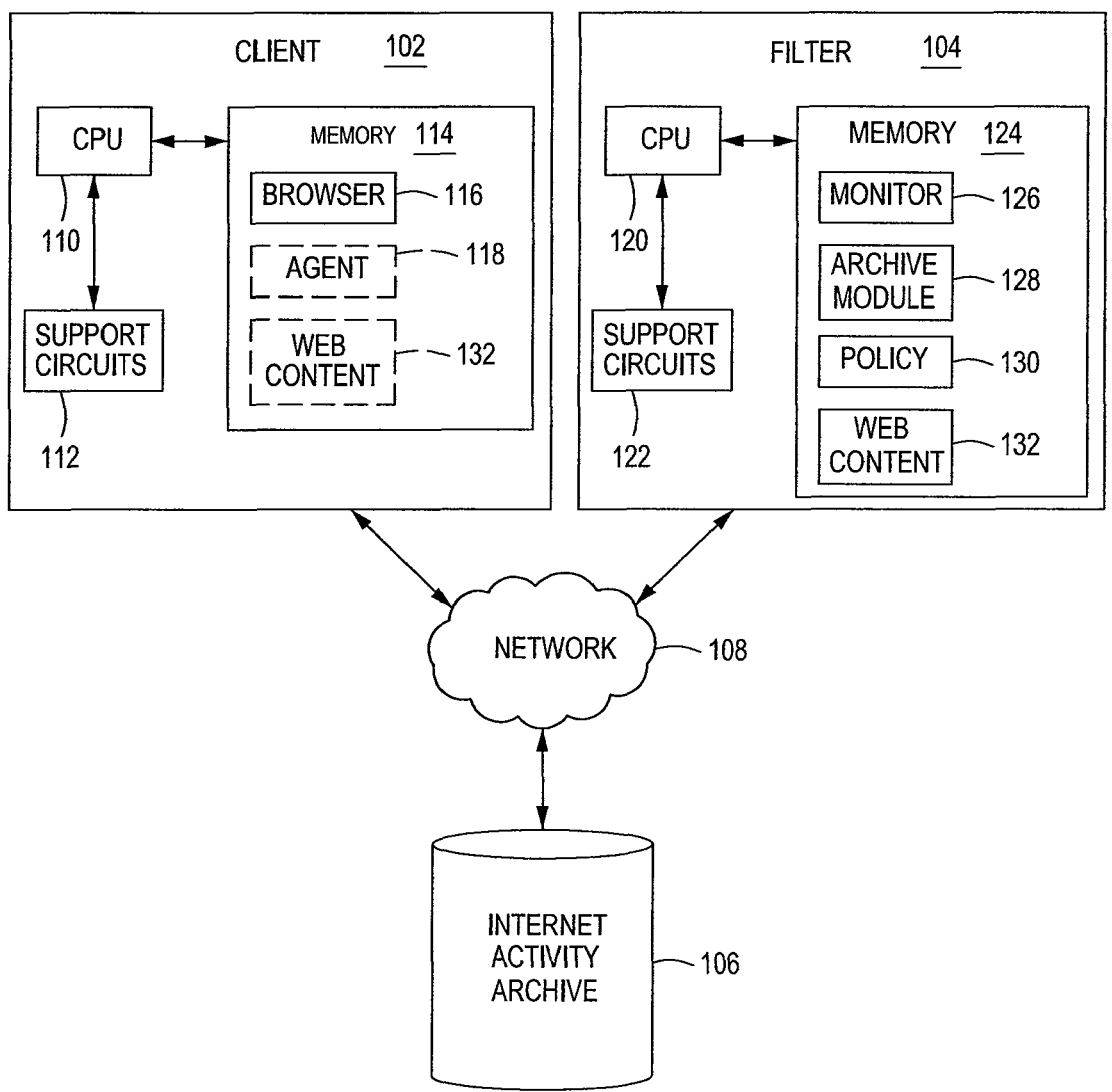
FIG. 1 is a block diagram of a system for archiving web content based on a policy according to an embodiment of the present invention.

FIG. 1 is a block diagram of a system 100 for archiving web content based on a policy according to an embodiment of the present invention. The system 100 comprises a client 102, a filter 104 and an archive 106 where each is coupled to each other through a network 108. In one embodiment, the system 100 archives a plurality of web pages flowing in and out of the client 102 and/or the filter 104 based on a policy 130.

During a period of internet activity (i.e., web browsing or visiting one or more web sites), the client 102 utilizes various network resources on the network 108 to connect to the internet (e.g., World Wide Web) and communicate data (e.g., data packets) with one or more computers. For example, the client 102 may use the Internet to access (e.g., download) web content 132, such as electronic mail, instant messages, web pages (e.g., Hypertext Markup Language (HTML) documents), web applications, electronic services, data files (e.g., multimedia) and/or the like. In one embodiment, the client 102 accesses the Internet through the filter 104.

The client 102 may be a computing device (e.g., a desktop computer, a laptop, a mobile phone, a Personal Digital Assistant (PDA) and/or the like) that comprises a Central Processing Unit (CPU) 110, various support circuits 112 and a memory 114. The CPU 110 may comprise one or more commercially available microprocessors or microcontrollers that facilitate data processing and storage. The various support circuits 112 facilitate operation of the CPU 110 and may include one or more clock circuits, buses, power supplies, input/output circuits and/or the like. The memory 114 includes a read only memory, random access memory, disk drive storage, optical storage, removable storage, and the like. The memory 114 further includes various software packages, such as a browser 116 and an agent 118.

The browser 116, generally, comprises software code for accessing the Internet and viewing web content 132 (e.g., one or more web pages, documents, data, applications, e-services, images, audio/video files, web e-mail messages and the like). The browser 116 may be a Hypertext Transfer Protocol (HTTP) compliant web browser application. In one embodiment, the browser 116 generates an interface to facilitate the internet activity. For example, a user requests and/or view the web content 132 through the interface of the browser 116.

The filter 104 may be a computing device (e.g., a desktop computer, a router or gateway, a laptop, a mobile phone, a Personal Digital Assistant (PDA) and/or the like) that comprises a CPU 120, various support circuits 122 and a memory 124. The CPU 120 may comprise one or more commercially available microprocessors or microcontrollers that facilitate data processing and storage. The various support circuits 122 facilitate operation of the CPU 120 and may include one or more clock circuits, buses, power supplies, input/output circuits and/or the like. The memory 124 includes a read only memory, random access memory, disk drive storage, optical storage, removable storage, and the like. The memory 124 further includes various data, such as the policy 130 and the web content 132. The memory 124 further includes various software packages, such as a monitor 126 and an archive module 128.

The filter 104 is configured to monitor the internet activity as described above. In one embodiment, the filter 104 stores information regarding the internet activity (e.g., a URL or an Internet Protocol (IP) address of a visited web site, an identity of a particular user or group that visited the web site, a level of security during the visit, data for an enabled Java script and/or the like). In another embodiment, the filter 104 assesses the web content 132 for one or more security risks and blocks or permits the communication of the web content 132 to the client 102. In one embodiment, the filter 104 may be a server computer (e.g. web server, file/application server and/or the like) that provides data storage and/or processing services to one or more client computers, such as the client 102. In another embodiment, the filter 104 may be a router (e.g., a gateway) that manages access to the Internet for the one or more client computers.

Generally, the archive 106 comprises data storage for storing archived web content. In one embodiment, the filter 104 determines one or more portions of the web content to be archived in accordance with the policy 130. Then, the filter 104 transmits the one or more archived portions of the web content 132 to the archive 106 for storage. In one embodiment, the archive 106 may be a relational database for managing one or more archived portions of the web content 132. Accordingly, a system administrator may subsequently use a database query (Standard Query Language (SQL) query) to retrieve the one or more archived portions of the web content 132 from the archive 106.

The network 108 comprises a communication system that connects computers by wire, cable, fiber optic and/or wireless link facilitated by various types of well-known network elements, such as hubs, switches, routers, and the like. The network 108 may further employ various well-known protocols to communicate information amongst the network resources. For example, the network 108 may be a part of the Internet or Intranet using various communications infrastructure, such as Ethernet, WiFi, WiMax, General Packet Radio Service (GPRS) and the like. The network 108 may be a part of a Local Area Network (LAN), a Wide Area Network (WAN), or any other known network architecture.

The monitor 126 comprises software code that is executed by the CPU 120. The monitor 126 is configured to process information associated with the Internet activity related to the client 102 and/or the filter 104. In one embodiment of the present invention, the monitor 126 examines data (e.g. data packets) communicated to the client 102 during the internet activity. The data packets comprise information associated with the internet activity, such as metadata, one or more domain names, one or more web page properties, Java scripts, Active X scripts and the like. These data packets may also comprise one or more web pages (e.g., HTML documents, XHTML documents and the like). In one embodiment, the monitor 126 stores one or more portions of the data communicated during the Internet activity as the web content 132.

In one embodiment of the present invention, the monitor 126 collects the web content 132 communicated during the Internet activity, such as text (e.g., HTML text), one or more multimedia files, interactive information (e.g., FLASH applications, Java applets, MICROSOFT WINDOWS controls, Dynamic HTML (DHTML) and/or the like), one or more hyperlinks, one or more scripts (e.g., a Java script), one or more forms (e.g., database forms), metadata (e.g., one or more web page properties) and the like. In one embodiment, the web content 132 comprises one or more portions of the information associated with the Internet activity. For example, the monitor 126 may store a number of web pages viewed by a particular user or group as the web content 132.

According to various embodiments of the present invention, the monitor 126 and the archive module 128 cooperate to archive one or more portions of the web content 132 in accordance with the policy 130. Such various embodiments may be referred to as agent less archival. In operation, the archive module 128 analyzes the information associated with the internet activity based on the policy 130 to identify the one or more portions of the web content 132 to be archived. Subsequently, the archive module 128 stores the one or more identified portions of the web content 132 in the archive 106. In another embodiment, the archive module 128 may compare the web content 132 with the policy 130 to determine the one or more portions of the web content 132 to be archived. For example, the policy 130 may indicate one or more domain names associated with one or more web pages to be archived. Hence, the archive module 128 compares a domain name of a visited web page to the one or more domain names to determine whether the visited web page is to be archived.

Generally, the policy 130 comprises an archival policy that is used to identify a portion of the web content 132 to be archived. In one embodiment, the policy 130 may indicate that a web page and/or each and every link (e.g., Hyperlink) within the web page is to be archived. In one embodiment of the invention, the policy 130 may indicate that a web page associated with a particular property is to be archived. For example, the policy 130 may instruct the archive module 128 to archive each and every non-secure web page. In another embodiment, the policy 130 may indicate that a web page comprising a Java Script is to be archived. In another embodiment, the policy 130 may indicate that a web page visited or viewed by a particular group, user and/or computer is to be archived.

In yet another embodiment of the invention, the policy 130 may also be configured to be dynamic (i.e., modifiable). The policy 130 may be modified based on an analysis of the web content 132. In one embodiment, the archive module 128 analyzes the web content 132 to modify the policy 130 in real time. For example, the real time analysis of the web content 132 may indicate that one or more web pages associated with a particular domain name is to be archived. As such, the policy 130 is modified by the archive module to include the particular domain name. Alternatively, the real time analysis may indicate that the one or more web pages associated with the particular domain name are not to be archived.

In an embodiment of the present invention, the policy 130 may indicate a retention period for managing the one or more archived portions of the web content 132 in the archive 106. For example, the archive 106 stores the one or more archived portions of the web content 132 until the retention period elapses. Then, the one or more archived portions of the web content 132 are deleted or removed from the archive 106. In addition, the retention period may be based upon a retention grade associated with a particular employee and/or a particular computer, such as the client 102. The retention grade for the particular employee or the particular computer may be determined based on the monitored Internet activity. For example, one or more web pages visited by a grade "A" employee (i.e., low level) may have a retention period for one year. Furthermore, a grade "B" employee and a grade "C" employee may be associated with retention periods of two years and three years, respectively. Accordingly, one or more retention periods are assigned to various employee grades until the Chief Operating Officer who has a retention period of seven years.

Optionally, the client 102 further includes the agent 118 and the web content 132. Such optional embodiments of the present invention may be referred to as agent based archival.

The agent 118 comprises software code for monitoring the internet activity associated with the client 102 (e.g., data packets communicated between the client 102 and the Internet). Alternatively, the agent 118 may be a component of the browser 116. In one embodiment, the agent 118 stores one or more portions of the information associated with the Internet activity as the web content 132.

In one embodiment, the agent 118 may be used to monitor web pages communicated to the client 102 (i.e., instead of the monitor 126). For example, the agent 118 may mirror or copy each and every web page communicated to the client 102. In one embodiment, the agent 118 may be configured to analyze the monitored web pages based on the policy 130 (i.e., instead of the archive module 128). Accordingly, the agent 118 identifies one or more web pages to be archived as indicated by the policy 130. Then, the agent 118 archives the one or more web pages in accordance with the policy 130. Furthermore, the agent 118 accesses security information associated with a user or group that is accessing the monitored web pages. The agent 118 may compare the security information with the policy 130 to determine a retention period for the user or group.

In yet another embodiment of the invention, an embodiment for agent based archival and an embodiment for agent less archival may be combined to deliver one or more advantages of both forms of web content archival. For example, ActiveX scripts or Java scripts are archived in accordance with the embodiment for agent less archival because the browser 116 may block such scripts from the client 102 through a pop-up blocker.

Figure 2:
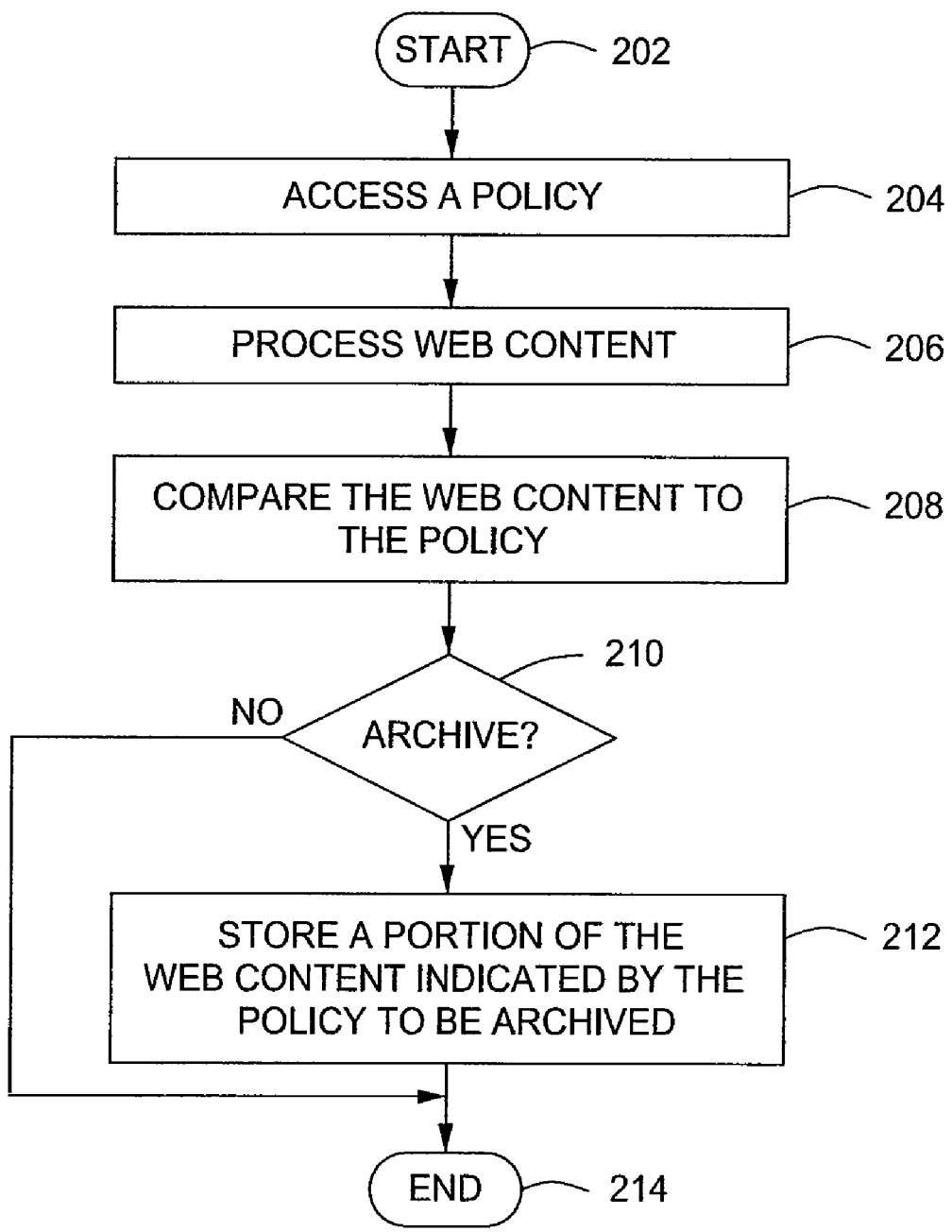
FIG. 2 is a flow diagram of a method for archiving web content based on a policy according to an embodiment of the present invention.

FIG. 2 is a flow diagram of a method 200 for archiving web content based on a policy according to an embodiment of the present invention. The method 200 has been explained with reference to the system 100 of FIG. 1, but may be embodied in any other system in accordance with one or more embodiments of the invention. The method 200 starts at step 202 and proceeds to step 204, at which a policy (e.g., the policy 130 of FIG. 1) is accessed. In an embodiment, the policy may indicate one or more web pages to be archived as described above.

At step 206, web content is processed. In one embodiment, the web content is communicated to a client computer or a filter during internet activity. At step 208, the web content is compared with the policy. In one embodiment, an archive module (e.g., the archive module 128 of FIG. 1) or an agent (e.g., the agent 118 of FIG. 1) may compare the web content to the policy.

At step 210, a determination is made as to whether a portion of the web content is to be archived. If no portion of the web content is determined to be archived (option "NO"), the method 200 proceeds to step 214 where the method 200 ends. If a portion of the web content is determined to be archived in accordance with the policy (option "YES"), the method 200 proceeds to step 212. At 212, the portion of the web content is stored. For example, a web page and one or more hyperlinks within the web page are stored in an archive (e.g., the archive 106 of FIG. 1). The method 200 proceeds to step 214. At step 214, the method 200 ends.

Figure 3:
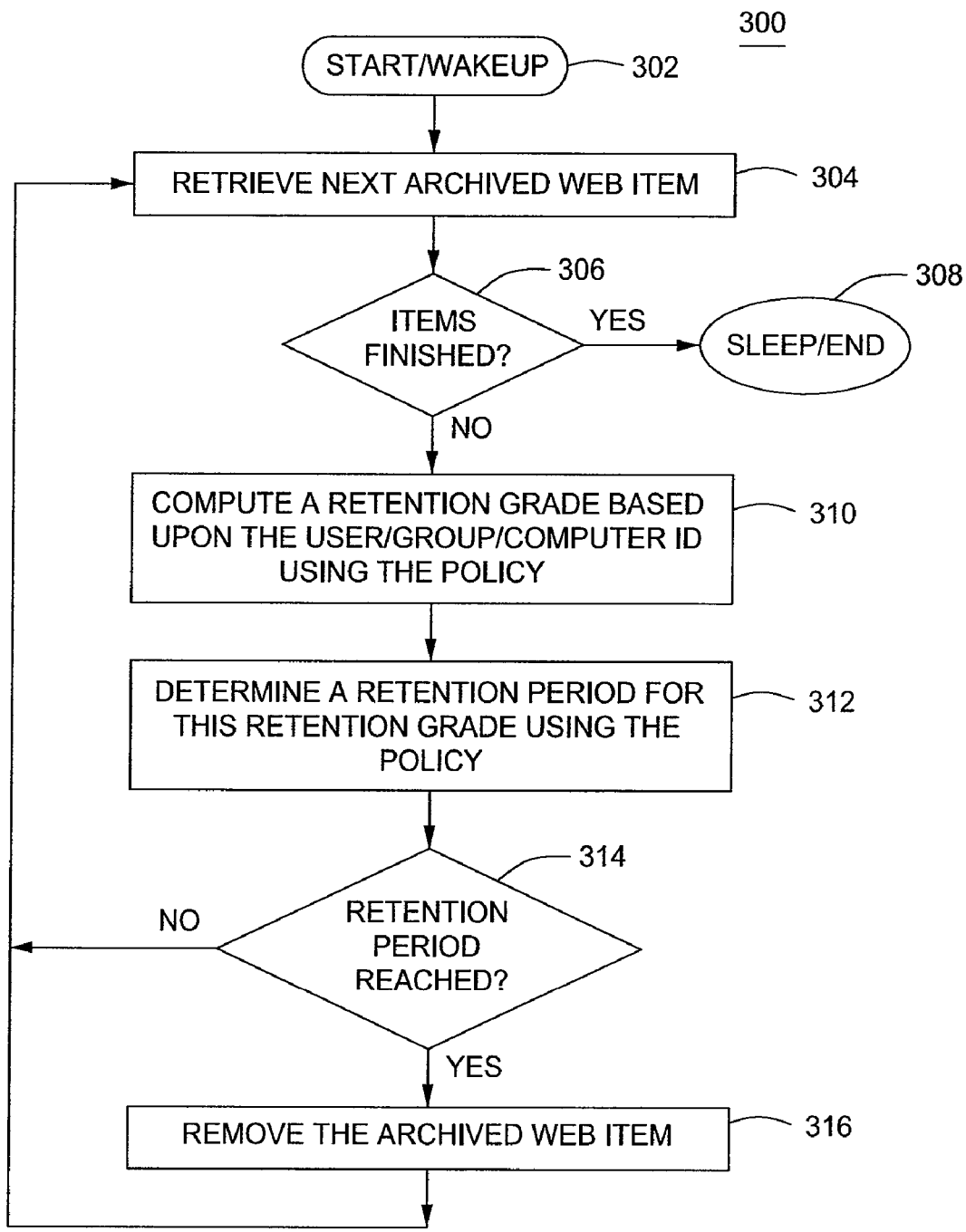
FIG. 3 is a flow diagram of a method for managing archived web content using a retention period according to an embodiment of the present invention.

FIG. 3 is a flow diagram of a method for managing archived web content using a retention period according to an embodiment of the present invention. The method 300 starts at step 302 and proceeds to step 304, at which a next archived web item (e.g., archived web content, such as a web page) is retrieved (e.g., from an archive, such as the archive 106 of FIG. 1). At step 306, a determination is made as to whether the retrieval of one or more archived web items has finished. If the retrieval of the one or more archived web items has finished, the method 300 proceeds to step 308 where the method 300 sleeps. The method 300 wakes up when a new web item is archived and returns to step 304 where the archived web item is retrieved. Alternatively, the method 300 ends at step 308. For example, the method 300 ends at step 308 upon an instruction from a storage administrator. If the retrieval of the one or more archived web items has not finished, the method 300 proceeds to step 310.

At step 310, a retention grade is computed based on a user id, a group id and/or a computer id using a policy (e.g., the policy 130 of FIG. 1). In one embodiment, the retention grade may be computed for a computer (e.g., the client 102 of FIG. 1) or a particular group of employees. At step 312, a retention period for the retention grade is determined using the policy. For example, the policy may define a retention period of one year for grade A employees. The policy may also define a retention period of two years for grade B employees. For example, an employee in a technical group may have retention grade A; whereas, an employee in a marketing group may have retention grade B because grade A employees pose a lower security risk for the enterprise than grade B employees. In addition, grade A employees may visit a significant number of web pages and require a lower retention period to free storage resources for further archiving.

At step 314, a determination is made as to whether the retention period of an archived web item is reached. In one embodiment, an archive module (e.g., the archive module 128 of FIG. 1) examines the archived web items and expires a web item based on various factors, such as a current time, a creation time and the retention period. In another embodiment, the archive module performs such an examination at regularly scheduled intervals. If the retention period of the archived web item is not reached (option "NO"), the method 300 returns to step 304. If the retention period of the archived web item is reached (option "YES"), the method 300 proceeds to step 316. At step 316, the archived web item is removed and the method 300 returns to step 304.

The various embodiments described herein offer various advantages. The various embodiments discussed herein may be embedded within security or monitoring software and thus may enhance endpoint as well as gateway protection of the network system. Furthermore, the policy based archival system described herein archives and delivers web content for legal scrutiny or e-discovery. Moreover by archiving the web content, the system further prevents data loss to facilitate disaster recovery.

While the foregoing is directed to embodiments of the present invention, other and further embodiments of the invention may be devised without departing from the basic scope thereof, and the scope thereof is determined by the claims that follow.

The invention claimed is:

1. A method for using a policy to archive web content, comprising:
   monitoring internet activity associated with at least one computer, wherein
      a set of web content is downloaded to the at least one computer during the internet activity;
   determining a portion of the set of web content to be archived, based on the policy, wherein
      the policy identifies a plurality of properties of web content to be archived, and
      the portion of the set of web content is associated with at least one property identified in the policy;
   archiving the portion of the set of web content in an archive, in response to the determining, wherein
      the archive is distinct from the at least one computer; and determining a retention grade, wherein
   the retention grade is determined for the at least one computer based on the internet activity, and
   the internet activity indicates a security risk posed by an employee using the at least one computer.

2. The method of claim 1, wherein the determining the portion further comprises
   comparing information associated with the internet activity to the plurality of properties identified in the policy.

3. The method of claim 2, wherein
the information indicates the portion is associated with a domain name of a web page and
the policy comprises the domain name.

4. The method of claim 3, wherein
   the policy indicates that the web page and at least one link within the web page are to be archived, and
   the portion comprises the web page and the at least one link.

5. The method of claim 2, wherein
   the information indicates the portion is associated with at least one of a user identification and a computer identification, and
   the policy indicates that all web content associated with the user identification and the computer identification is to be archived.

6. The method of claim 2, wherein
   the policy indicates that a web page visited by the employee is to be archived, and
   the information associated with the internet activity indicates the portion of the set of web content is visited by the employee.

7. The method of claim 1, wherein the archiving the portion further comprises
   storing the portion of the set of web content for a duration of a retention period, wherein
      the policy defines the duration of the retention period based on the retention grade of the employee that downloaded the portion of the web content, and
      the retention grade is one of a plurality of retention grades associated with a plurality of employees.

8. The method of claim 1, wherein
   the retention grade is determined for the employee based on a security risk posed by the employee,
   an employee group of the employee indicates the security risk posed by the employee, and
   a greater security risk indicates a longer retention period.

9. The method of claim 1, wherein the determining the portion further comprises
   examining the web content communicated during the internet activity for at least one property identified in the policy.

10. The method of claim 1, further comprising:
analyzing the web content to produce an analysis result; and
modifying the policy based on the analysis result.

11. The method of claim 1, further comprising:
modifying the policy in real time, wherein
   the at least one computer accesses one or more web sites during the internet activity,
   the set of web content is downloaded from the one or more web sites to the at least one computer during the internet activity,
   the one or more web sites are associated with a domain name, and
   the policy is modified to include the domain name.

12. The method of claim 1, wherein the archiving the portion of the set of web content comprises
   transmitting the portion of the set of web content to the archive, wherein
      the archive comprises a relational database, and
      the archive is configured to retrieve the portion of the set of web content in response to one or more database queries.

13. The method of claim 1, wherein the set of web content comprises one or more web pages, documents, applications, electronic services, multimedia files, electronic mail, instant messages, data, metadata, scripts, hyperlinks, and forms.

14. An apparatus for using a policy to archive web content, comprising:
   a memory configured to store the policy, wherein
      the policy is configured to identify a plurality of properties of web content to be archived; and
   an archive module configured to
      determine a portion of a set of web content to be archived based on the policy, wherein
         the set of web content is downloaded during internet activity associated with the apparatus, and
         the portion of the set of web content is associated with at least one property identified in the policy,
      archive the portion of the set of web content in an archive, in response to the determination of the portion to be archived, and
      determine a retention grade, wherein
         the retention grade is determined for the at least one computer based on the internet activity, and
         the internet activity indicates a security risk posed by an employee using the at least one computer.

15. The apparatus of claim 14 further comprising
an agent configured to monitor the web content communicated during the internet activity.

16. The apparatus of claim 15, wherein
the agent copies at least one web page communicated during the internet activity, and
the set of web content comprises the at least one web page.

17. The apparatus of claim 14, wherein
the archive module is further configured to compare properties of the set of web content with the plurality of properties identified in the policy, wherein
   the portion is associated with a domain name of at least one web page, and
   the policy comprises the domain name and indicates that the at least one web page is to be archived.

18. The apparatus of claim 14, wherein
the archive module is further configured to compare information associated with the internet activity with the plurality of properties identified in the policy, wherein
   the information indicates the portion is associated with at least one of a user identification and a computer identification, and
   the policy indicates that all web content associated with the user identification and the computer identification is to be archived.

19. The apparatus of claim 14, wherein
the archive module is further configured to store the portion of the set of web content for a duration of the retention period, wherein
   the policy defines the duration of the retention period based on a retention grade of the employee that downloaded the portion of the web content, and
   the retention grade is one of a plurality of retention grades associated with a plurality of employees.

20. A system for using a policy to archive web content, comprising:
  a filter for monitoring internet activity, comprising:
    a monitor module configured to monitor a set of web content downloaded to at least one client computer during the internet activity, wherein the internet activity is associated with the at least one client computer, and
    an archive module configured to
      determine a portion of the set of web content to be archived based on the policy, wherein
        the policy identifies a plurality of properties of web content to be archived, and
        the portion of the set of web content is associated with at least one property identified in the policy,
      archive the portion of the set of web content in an archive, in response to the determination of the portion to be archived, and
      determine a retention grade, wherein
        the retention grade is determined for the at least one computer based on the internet activity, and
        the internet activity indicates a security risk posed by an employee using the at least one computer; and
  the at least one client computer for communicating the set of web content during the internet activity.

21. The system of claim 20, wherein
the archive module is further configured to store the portion of the set of web content for a retention period defined by the policy, wherein
  the retention period is associated with a retention grade of the employee that downloaded the portion of the set of web content, and
  the retention grade is one of a plurality of retention grades associated with a plurality of employees.

22. The system of claim 20, wherein
the archive module is further configured to compare information associated with the internet activity with the plurality of properties identified in the policy, wherein
  the information indicates the portion is associated with a domain name of at least one web page
  the policy comprises the domain name and indicates that the at least one web page is to be archived, and
  the portion comprises the at least one web page.

23. The system of claim 20, wherein the archive module is further configured to compare properties of the set of web content with the plurality of properties identified in the policy to determine the portion of the web content to be archived.

24. A method for using a policy to archive web content, comprising:
  monitoring internet activity associated with at least one computer, wherein
    a set of web content is downloaded to the at least one computer during the internet activity;
  determining a portion of the set of web content to be archived, based on the policy, wherein
    the policy identifies a plurality of properties of web content to be archived, and
    the portion of the set of web content is associated with at least one property identified in the policy;
  archiving the portion of the set of web content in an archive, in response to the determining, wherein
    the archive is distinct from the at least one computer; and
  determining a retention grade, wherein
    the retention grade is determined based on a computer identification of the at least one computer.

25. A method for using a policy to archive web content, comprising:
  monitoring internet activity associated with at least one computer, wherein
    a set of web content is downloaded to the at least one computer during the internet activity;
  determining a portion of the set of web content to be archived, based on the policy, wherein
    the policy identifies a plurality of properties of web content to be archived, and
    the portion of the set of web content is associated with at least one property identified in the policy;
  archiving the portion of the set of web content in an archive, in response to the determining, wherein
    the archive is distinct from the at least one computer; and
  determining a retention grade, wherein
    the retention grade is determined based on an employee identification of an employee that viewed the set of web content.

* * * * *